Aug. 2, 1966  R. BÄR  3,263,658

TURBOENGINE

Filed Jan. 24, 1963  4 Sheets-Sheet 1

INVENTOR
RUDOLF BÄR

BY Dicke & Craig
ATTORNEYS

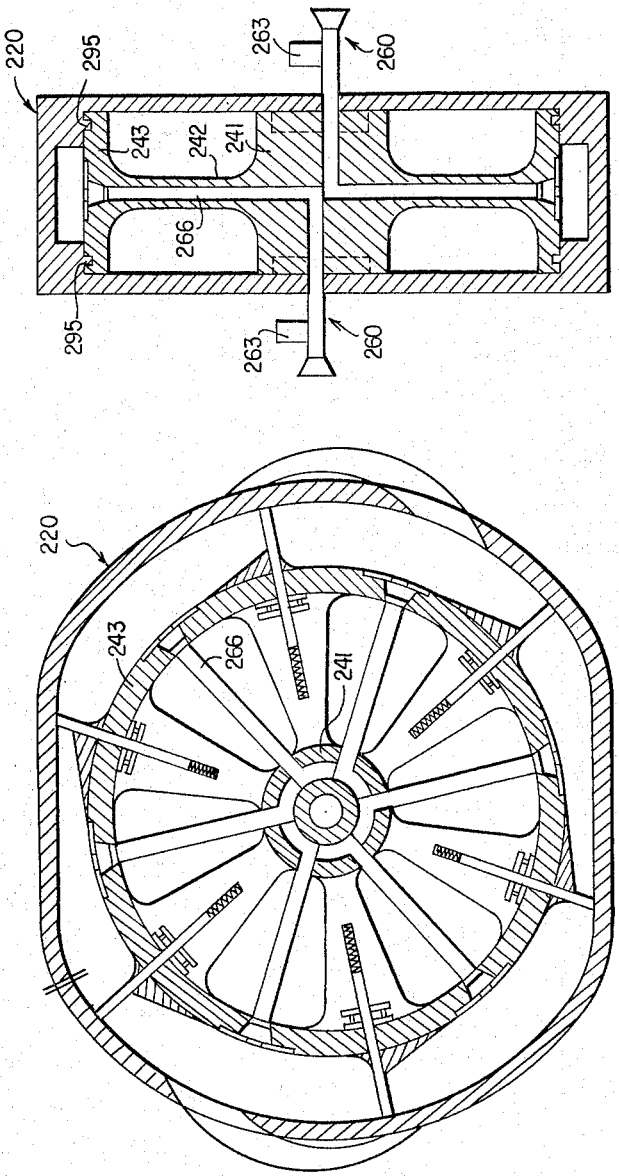

Aug. 2, 1966  R. BÄR  3,263,658

TURBOENGINE

Filed Jan. 24, 1963  4 Sheets-Sheet 3

INVENTOR
RUDOLF BÄR

BY  *Dicke & Craig*

ATTORNEYS

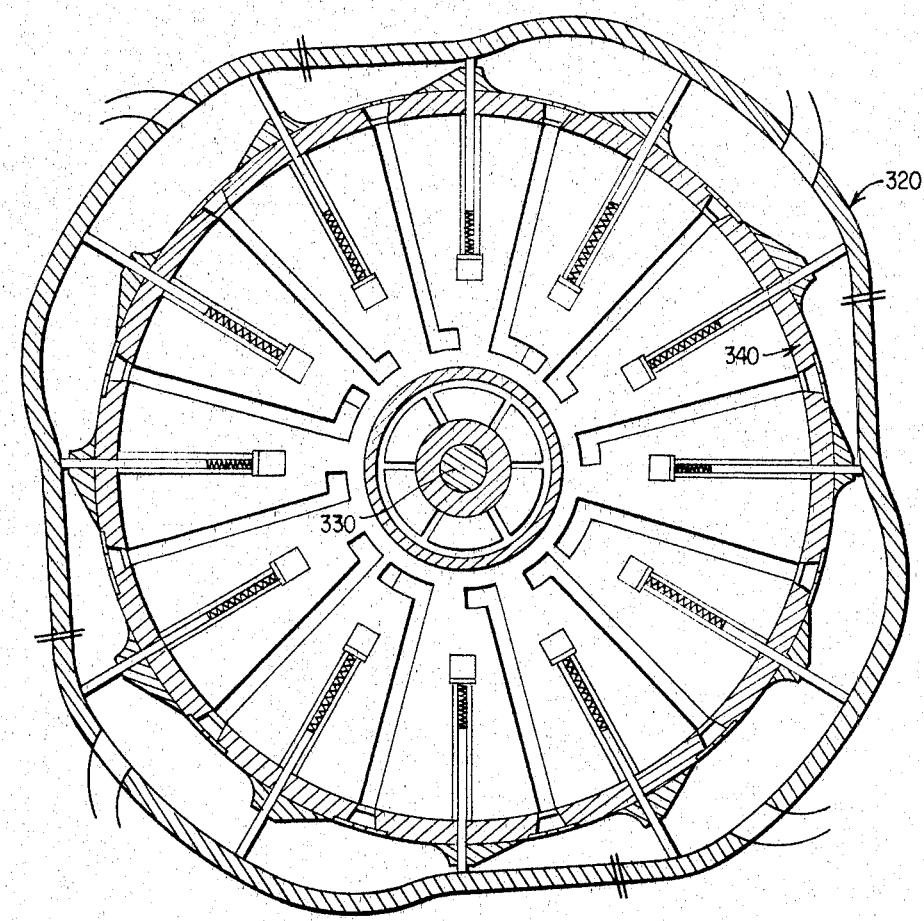

United States Patent Office 3,263,658
Patented August 2, 1966

3,263,658
TURBOENGINE
Rudolf Bär, 22 Stockheimer Strasse, Stuttgart-
Zuffenhausen, Germany
Filed Jan. 24, 1963, Ser. No. 265,572
Claims priority, application Germany, Jan. 24, 1962,
B 65,626
9 Claims. (Cl. 123—16)

The present invention relates to a turbomotor, and more particularly to a turbomotor of the rotary piston motor type whose rotor is a circular column. The term "circular column" which has been coined to describe the present invention, and more particularly to describe the rotor of the turbomotor in accordance with the present invention, utilizes the term "column" in its ordinary meaning. A column consists of a base, in the instant situation forming the drive shaft, a bearer or supporting portion and a capital. Since the rotor of the present invention is contituted by a column-like structure of substantial inertia as viewed in the axial cross section, which is circular or endless, as viewed in a cross section perpendicular to the axis, the term "circular column" properly describes the rotor structure of the present invention. Obviously, the supporting members of the circular column may be spaced over the circumference, the word "circular" being applicable to the instant rotor structure by reason of a continuous or endless capital structure.

Furthermore, the present invention relates to a conversion of the mechanism of the piston type internal combustion engine for the generation of power and its transmission to the driven shaft, in a turboengine with a direct force transmission to the driven shaft utilizing the lever principle.

In the prior art a gas mixture is compressed in a cylinder for the generation of power and is ignited therein. The thus produced force or power is transmitted by means of pistons, connecting rods and crank shaft to the driven shaft. In the present invention the gas mixture is compressed and ignited in chambers. The chambers are disposed over a circular column and move along the curved track constituted by an eccentric cylindrical housing. The force transmission takes place by the same circular column directly to the driven shaft according to the lever principle.

According to the present invention a turboengine has been developed which in its construction excels by its simplicity and sturdiness. Additionally, the turboengine of the present invention permits a considerable reduction in the manufacturing costs thereof combined with lower fuel consumption and improved output. Furthermore, the turboengine of the present invention makes only very slight demands as regards maintenance and servicing.

Accordingly, it is an object of the present invention to provide a turboengine of the rotary piston internal combustion engine of the type described above which is simple in construction and inexpensive in manufacture yet produces a relatively high output.

Another object of the present invention resides in the provision of a turboengine of the type described above which is characterized by relatively low fuel consumption combined with improved performance.

A further object of the present invention resides in the provision of a turboengine of the rotary piston internal combustion engine type which requires little maintenance and assures relatively long length of life.

A further object of the present invention resides in the provision of a turboengine which effectively utilizes the rotor to produce a two-stage compressor action, and which is so constructed and arranged as to increase the output due to improved combustion processes.

These and other objects, features and advantages of the present invention will become more obvious from the following description when taken in connection with the accompanying drawing which shows, for purposes of illustration only, several embodiments in accordance with the present invention, and wherein FIGURE 1 is a somewhat schematic transverse cross sectional view through a three-chamber turboengine in accordance with the present invention, the cross section being taken at right angle to the engine axis.

FIGURE 2 is a somewhat schematic partial axial cross sectional view through the turboengine of FIGURE 1.

FIGURE 3 is an elevational view of a slidable sealing member used with the turboengine of the present invention.

FIGURE 4 is an elevational view of a bow-shaped sealing element used in connection with the slidable sealing element of FIGURE 3.

FIGURE 5 is a transverse cross-sectional view similar to FIGURE 1 through a still further modified embodiment of a turboengine in accordance with the present invention having six chambers.

FIGURE 6 is a schematic axial cross sectional view through the turboengine of FIGURE 7.

FIGURE 8 is a schematic transverse cross sectional view through the turboengine of FIGURE 7.

Figure 7:
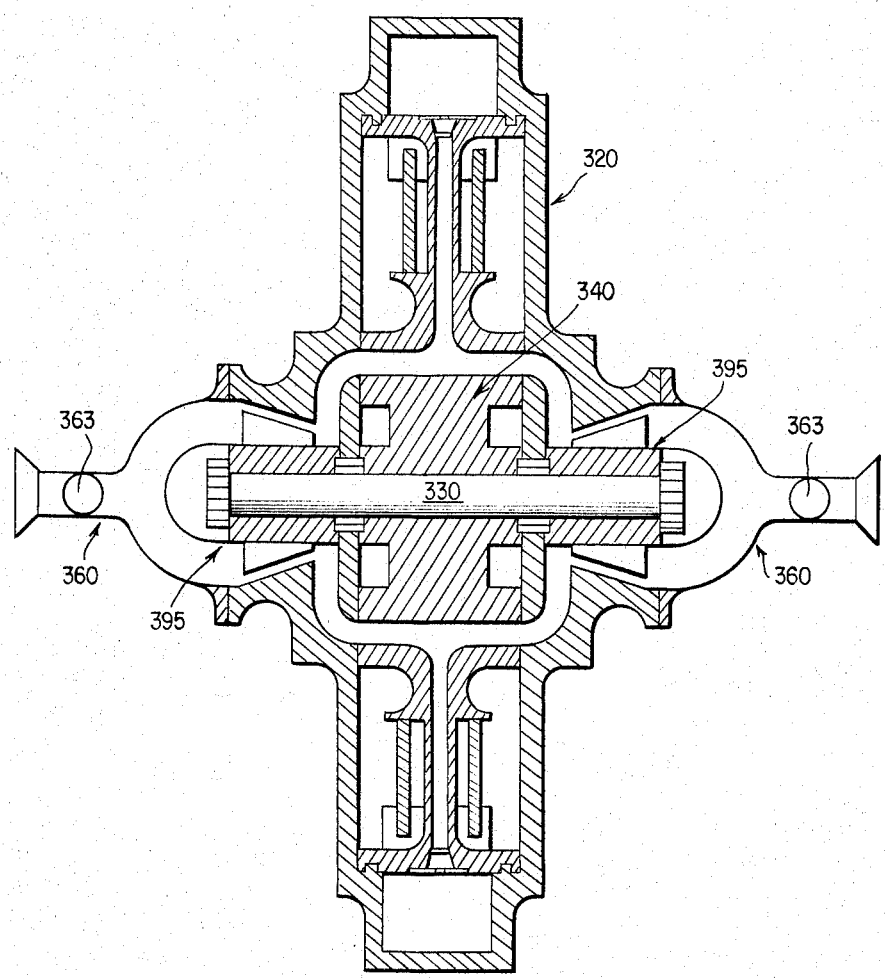
FIGURE 7 is an axial cross sectional view of still another modified embodiment of a large turboengine in accordance with the present invention.

Referring now to the drawing wherein like reference numerals are used throughout the various views to designate like parts, and more particularly to FIGURES 1 through 4, the turboengine of the present invention essentially consists of the housing generally designated by reference numeral 20. The rotor generally designated by reference numeral 40 is suitably secured to and rotatably supported by means of the shaft 30 within the housing 20 in any conventional manner. The rotor 40 is of essentially circular external shape and is constituted by a circular column including a base portion 41, the bearer portions 42 and the capital portion 43. In addition, cam members 44 are suitably secured along the outer surface of the capital portion 43. Each of the cam members 44 is provided with a concave surface portion 45 of relatively small radius of curvature and a convex surface portion 46 of relatively large radius of curvature. The surface portion 45 thereby trails the surface portion 46 of each cam member 44 in the normal direction of rotation of the rotor 40 as indicated by arrow $x$ in FIGURE 1.

The air and fuel mixture supply system is generally designated in FIGURE 2 by reference numeral 60 and includes a conventional inlet 61, for example provided with the usual air filter through which air flows into the ducts 62 with which cooperates the carburetor 63. The fuel air mixture then enters through the duct 64 in the housing 40 into the inlet slide valve channels 65 provided within the base portion 41 of the circular column. The inlet channels 65 are accommodated laterally of the housing within the base portion 41 and extend over a predetermined arcuate length such that the admission of fuel air mixture corresponds substantially to the inlet path indicated by the arrow in FIGURE 1. As is obvious, the slide valve arrangement illustrated in FIGURES 1 and 2 determines both the inlet periods and the inlet paths. The fuel air mixture then passes from inlet channel 65 into a corresponding radial duct or channel 66 provided within the bearer portion of the circular column. The radial duct or channel 66 thereby constitutes a radial compressor in that the centrifugal force within the duct or channel 66 is utilized for the compression as precompressor stage. A conventional check or relief valve 67 terminates the channel 66, the valve being so constructed in the usual manner that it opens when the pressure within channel 66 is greater than the pressure within the chamber 50 disposed radially outwardly of the valve 67. When the inlet channel 65 or corresponding inlet channels 65' and 65" comes into communication with the duct 64, then the fuel air mixture which is placed under pressure within the channel 66, reaches the disk valve 67, lifts the latter and thus enters into the chamber 50. Corresponding parts of the other two chambers of the three-chamber engine are designated by primed and double primed reference numerals. After the inlet channel 65 has moved past the inlet duct 64, the inlet operation is terminated and the chamber now finds itself already at the beginning of the rotary piston compressor system as second precompression stage. Chamber 50' is in that position in the illustrated embodiment. The gas pressure now prevailing within chamber 50' closes the valve 67 in order to increase the compression during the further rotation while passing underneath the eccentric housing section 22. A rotary piston compressor results from the rotor 40 constituted by the circular column. The outer circumference of the rotor 40 is thereby disposed concentrically to its axis. By reason of the particular construction of the cam members 44, the larger volume is produced in the forward portion of the chamber, as seen in the direction of rotation of the rotor, at the ignition moment. While the housing 20, inorder to produce the desired compression effect, consists of two circular sections 21 and 22, the former concentric and the latter eccentric with respect to the axis of rotation, any other suitable configuration may be used to achieve the desired compression ratio as is well known to a person skilled in the art. Furthermore, by appropriate design of the section 22 of the housing any desired pressure generation may be realized that one seeks to obtain from a particular medium. To achieve ignition, a conventional ignition means generally designated by reference numeral 70 is schematically illustrated in the drawing. The letter P indicates the adjusting point whose function corresponds to a similar point in piston engines.

At the ignition moment the following takes place insofar as chamber 50' is concerned. The centrifugal force together with a circular movement in the counterclockwise direction is effective as spiral force from the inner circle to the outer circle. As a result thereof the highest pressure is produced in the forward outermost corner of the chamber 50'. Since the ignition at the ignition moment is located shortly to the rear of the forward separating wall of the chamber, to be described more fully hereinafter, the path from the ignition to the separating wall is relatively short. The pressure, during the expansion of the explosion, then moves from the place of highest pressure of the chamber 50' immediately to the forward separating wall of the chamber. Since the rotor 40 continues to rotate, the impact of the gas reinforces the velocity and force of the movable rotor 40. Simultaneously therewith the expansion also takes place in the direction toward the inner circle and toward the rear into the low compression degree of the chamber 50'. A counter pressure results from the centrifugal force which occurs at the same time as inertia force which counter pressure is effective as a moment cushion system. At that moment the rotor 40 reaches the beginning of the exhaust generally designated by reference numeral 75 where the expansion can continue.

Since the forward chamber separating wall of chamber 50' has now reached the outlet aperture 75 this chamber now finds itself in the exhaust phase, corresponding to the position of chamber 50". The exhaust results from the expansion simultaneously produces a suction. The burned gases are thereby driven by the effect of the centrifugal force away from the rotor 40 into the exhaust aperture 75 and the suction is produced thereby which acts then also on the remaining gases insofar as they have not been expelled by the expansion in the tangential direction. The exhaust phase is terminated when the rear separating wall of a chamber passes below the exhaust aperture 75. After the exhaust aperture 75 has been passed, a new inlet or intake phase takes place which corresponds to the arcuate extent indicated by the arrow in FIGURE 1.

Once the inlet slide valve channel 65 has moved past the inlet duct 64, no gas can any longer enter into the particular slide valve system. The centrifugal force within the radial duct 66 presses the remaining gas now under the valve disk 67 whereby a new vacuum is produced in the direction from the inlet channel 65. If a new inlet phase now commences then the gas pressure underneath the valve 67, the vacuum in the pipe or duct 66 and the centrifugal force in the duct 66 becomes effective for the inlet.

It is obvious that in the course of a rotation of the turboengine the inlet phase corresponding to chamber 50, the compression and ignition phase corresponding to the chamber 50' as well as the exhaust phase corresponding to the chamber 50" take place simultaneously thereby producing three ignitions per rotation.

In order to provide the necessary separating walls between the chambers and to permit the chambers to slide along the internal surface of the eccentric housing section 22 slide members generally designated by reference numeral 80 are built into the separating walls. The slide members 80, after passage through the eccentric section 22 of the housing, are again displaced outwardly by means of springs 81. By reason of the high pressure that is produced along the compression path, the spring pressure for the slide members 80 has to be relatively strong. This would normally produce a strong braking effect as well as also a high wear along the internal sliding surfaces of the housing 20. To alleviate these disadvantages a bow-shaped sealing member generally designated by reference numeral 90 and provided with apertures 91 in the corners thereof is inserted into the slide member 80. Springs 92 of conventional construction are adapted to be inserted into the apertures 91 so as to normally urge the bow-shaped member 90 into engagement with the internal sliding surfaces of the housing 20. A labyrinth seal 95 (FIG. 2) is effectively constituted by annular grooves provided along the peripheral surface of the capital portion 43 laterally of the chambers 50, 50' and 50" into which engage correspondingly shaped inwardly directed projections provided along the inner surfaces of the housing.

The effect of the centrifugal force in the chambers is of advantage for purposes of sealing the escape out of the rotary piston compressor between the rotor and the housing sliding surfaces. Simultaneously therewith the centrifugal force in the direction away from the axis may be used as counter pressure. Insofar as such seal is not obtained as described above, the cylindrical casing may also be sealed by means of an annular groove and complementary ring accommodated therein.

In summary, the compression of the gases takes place in a two-stage compressor consisting of radial compressor and rotary piston compressor. A separate slide valve system is provided for each chamber. The first compressor stage utilizes the centrifugal force present in channels 66. Valve 67 valves the passage from the radial compressor 66 to the rotary piston compressor. This valving takes place automatically.

Those parts indicated schematically may be of any conventional construction.

FIGURES 5 and 6 illustrate a turboengine in accordance with the present invention which operates on the three chamber system and has six chambers over the circumference. Corresponding parts are designated in this embodiment by corresponding reference numerals of the 200 series. This embodiment includes a carburetor 263 on each side of the engine.

FIGURES 7 and 8 illustrate a turboengine which operates on the three chamber system and has twelve chambers along the circumference, divided into four working systems equalling forty eight ignitions per revolution. A compressor 395 and a carburetor 363 are provided on both sides.

What is claimed is:

1. A turboengine having an axis of rotation, comprising:

housing means having a portion concentric to and a portion eccentric to said axis, rotor means rotating within said housing means about said axis and including fixed partition wall means effectively providing a plurality of adjoining, rotating, chambers between the other surfaces of said rotor means and the inner surfaces of said housing means, said chambers being distributed over the entire circumference of the rotor means and being of substantially constant length in the circumferential direction, said chambers passing respectively through successive intake, compression and ignition as well as exhaust phases, said rotor means being constituted by a circular column structure having a base portion mounted on said shaft, a capital portion disposed radially outwardly thereof, and at least one bearer portion connecting said base portion with said capital portion, supply means for supplying a combustion mixture to said chambers in predetermined sequence, including slide valve means for each chamber constituted by cooperating apertures in said housing means and said base portion and operable automatically by rotation of said rotor means to selectively supply said mixture to said chambers, the bearer portion of said circular column being provided with substantially radially extending channel means for each chamber forming part of the supply means and effectively constituting a radial precompressor, and valve means disposed near the radially outer end of a respective channel means, each of said partition wall means including surface portions to provide a relatively large volume in each chamber in the leading portion thereof and a relatively small volume in the trailing portion thereof, as seen in the normal direction of rotation of said rotor means, ignition means in said housing means for igniting the compressed mixture of a chamber, said ignition means being located in said housing means near the forward separating wall means of a respective chamber at the ignition moment thereof, exhaust means in said housing means to enable exhaust of the burned fuel mixture, an output shaft, and means mounting said rotor means on said shaft for rotation in unison therewith to transmit the forces produced in said engine directly to shaft with a predetermined leverage corresponding to the radial distance of the chambers from said shaft.

2. A turboengine according to claim 1, further comprising spring-loaded radial seal means in each separating wall means.

3. A turboengine according to claim 2, wherein each radial seal means includes a slidable member, a bow-shaped outer sealing member received in the slidable member, and spring means between a slidable member and a corresponding sealing member normally urging the latter radially outwardly relative to the former.

4. A turboengine according to claim 1, further comprising two-stage precompressor means constituted by said rotor means.

5. A turboengine according to claim 1 wherein said cooperating apertures constituting said slide valve means include one aperture on said housing means and for each channel, an aperture in said rotor means open in the axial direction and of a relatively long segmental shape, as viewed in a plane transverse to the axis of the turboengine to assure a relatively long intake phase.

6. A turboengine according to claim 5, wherein said valve means in the channel means are freely operable valves actuated automatically by the prevailing pressures on both sides thereof.

7. A turboengine according to claim 6, wherein said exhaust means is located in said housing means ahead of but close to the forward partition wall means of a respective chamber when the latter is in the position where said ignition means becomes operable.

8. A turboengine according to claim 1, wherein said valve means in the channel means are freely operable valves actuated automatically by the prevailing pressure on both sides thereof.

9. A turboengine according to claim 1, wherein said exhaust means is located in said housing means ahead of but close to the forward partition wall means of a respective chamber when the latter is in the position where said ignition means becomes operable.

References Cited by the Examiner

UNITED STATES PATENTS

| 1,113,234 | 10/1914 | Morgan | 123—16 |
| 1,199,229 | 9/1916 | Augustine | 123—16 |
| 1,307,282 | 6/1919 | Ward | 123—14 |
| 1,350,231 | 8/1920 | McFarland | 123—8 |
| 1,776,452 | 9/1930 | Rosenthal | 123—8 |
| 2,118,253 | 5/1938 | Larson | 123—16 |
| 2,366,213 | 1/1945 | Pover | 123—8 |
| 2,468,451 | 4/1949 | Kutzner | 123—16 |

MARK NEWMAN, *Primary Examiner.*

JOSEPH H. BRANSON, Jr., SAMUEL LEVINE,
*Examiners.*

R. M. VARGO, *Assistant Examiner.*